United States Patent [19]

Taylor et al.

[11] Patent Number: 5,039,029
[45] Date of Patent: Aug. 13, 1991

[54] MISSILE ORIENTATION MONITOR

[75] Inventors: Leonard S. Taylor, Silver Spring; Bernard V. Kessler, Greenbelt, both of Md.

[73] Assignee: The United States of America as represented by the Secretary of the Navy, Washington, D.C.

[21] Appl. No.: 398,153

[22] Filed: Jul. 1, 1982

[51] Int. Cl.$^5$ ............................................... F41G 7/00
[52] U.S. Cl. ................... 244/3.11; 244/3.14; 244/3.21
[58] Field of Search ............ 244/3.14, 3.11, 3.19, 244/3.1, 3.21

[56] References Cited

U.S. PATENT DOCUMENTS

| | | | |
|---|---|---|---|
| 3,876,308 | 4/1975 | Alpers | 244/3.16 |
| 4,020,339 | 4/1977 | Gustafson | 244/3.13 |
| 4,107,678 | 8/1978 | Powell | 244/3.19 |
| 4,148,028 | 4/1979 | Fujiki | 343/7 VM |
| 4,264,907 | 4/1981 | Durand, Jr. et al. | 244/3.19 |

Primary Examiner—Charles T. Jordan
Attorney, Agent, or Firm—Kenneth E. Walden; John G. Wynn

[57] ABSTRACT

A monitor determines, from the ground, the orientation (roll and attitude) of a missile by observation of the character of a transmitted signal(s) therefrom. By transmitting to a ground receiver a linearly polarized signal(s), the missile identifies a given plane fixed with respect to its body frame. This plane is identified at the ground receiver by comparing the ratio of the signal(s) received in any two cross-polarized directions. To resolve the attendant 180° ambiguity, the monitor employs an antenna array disposed on the missile that is switchable, back and forth, between two equal power lobes. The monitor operates with a single transmitter, and the simple lobe structure of the transmitted signal(s) is obtained using a linearly polarized antenna array with electronic phase switching between the aforementioned equal power lobes.

5 Claims, 3 Drawing Sheets

MISSILE ORIENTATION MONITOR

BACKGROUND OF THE INVENTION

1. Field of the Invention

The present invention relates to apparatus for determining the relative orientation of a missile vis-a-vis a target, but more specifically, the present invention relates to an apparatus for determining the roll angle of the missile vis-a-vis the target 2. Description of the Prior Art The effectiveness of an anti-aircraft missile against its target can be enhanced by the use of a "shaped" charge in the warhead which explodes as the missile passes by the aircraft. This is because near misses occur more often than direct hits. The use of a "shaped" charge which directs the explosive effect increases the miss distance which allows for a "kill" by a large factor as compared to the use of an ordinary warhead with a spherical charge However, the "shaped" charge can only be effective if it can be detonated when the missile passes by the target and its roll axis has rotated to the proper position. In general, anti-aircraft missiles are not roll-stabilized and are spinning rapidly. Moreover, ordinary radar data only provide information on missile and target position Thus, there is a need in the prior art to monitor missile roll orientation to determine the proper moment for detonation if the improvement offered by the "shaped" charge warhead is to be exploited.

As further background material, in U.S. Pat. No. 4,264,907, filed Apr. 17, 1968, to Durand, Jr. et al, entitled, "Rolling Dual Mode Missile", is disclosed a rolling missile seeker system which is responsive to RF and/or IR energy emanating from a target The system has the capability to switch between guidance modes during the travel of the missile towards its intended target. In U.S. Pat. No. 4,148,028, filed Aug. 2, 1977, to Fujiki, entitled, "Radar System for an Anti-collision System for a Vehicle", is disclosed an anti-collision system for a vehicle wherein a pair of antennas are mounted on the vehicle to receive an echo wave reflected from an obstacle to produce a pair of Doppler signals. The variation of the phase difference of the signals is used to indicate the direction of the relative movement of the obstacle. In U.S. Pat. No. 4,020,339, filed May 19, 1975, to Gustafson, entitled, "System for Determining the Deviation of an Object From a Sight Line", is disclosed a system for determining the deviation of a guided missile form a sight line extending from the missile launcher to a target. In U.S. Pat. No. 3,876,308, filed May 24, 1971, to Alpers, entitled, "Automatic Command Guidance System using Optical Trackers", is disclosed a missile guidance system wherein first and second electro-optical tracking devices are used to track a target and to acquire and track a missile, respectively, by using the angular position data from corrections necessary to bring the missile into line with the target.

The prior art, as indicated hereinabove, include advances in guidance and tracking systems for missiles. However, insofar as can be determined, the prior art does not teach, inter alia, identifying, at a ground receiver the plane of a missile fixed with respect to it body frame by comparing the ratio of signal(s) transmitted from the missile and received at the ground receiver in two cross-polarized directions as taught by the present invention.

OBJECTS OF THE INVENTION

Accordingly, an important object of the present invention is to determine missile orientation (roll angle) relative to a target without measurements on-board the missile.

Another important object of the present invention is to eliminate the need for integration of roll rate or acceleration of the missile to accomplish the above object.

Yet another important object of the present invention is to determine, from the ground, the orientation (roll angle) of the missile relative to the target from observation of the character of a signal(s) transmitted from the missile and received by a ground receiver.

Still another important object of the present invention is to accomplish the foregoing while requiring only a single transmitter in the missile and a single receiver on the ground.

SUMMARY OF THE INVENTION

In accordance with the above stated objects, other objects, features and advantages, the present invention has as a primary purpose to determine the relative orientation (roll angle) of a missile vis-a-vis a target so that an explosive charge therein can be exploded at the optimum location from the target for the greatest effect.

The essence of the present invention lies inn the transmitting, from the missile to a ground receiver, of a linearly polarized signal(s). The missile identifies a given plane fixed with respect to its body frame. This plane is identified at the ground receiver by comparing the ratio of the signal(s) received by the ground receiver in any two cross-polarized directions.

The purpose of the present invention is carried out by configuring a missile orientation monitor to include an air transmitter device including a linearly polarized antenna array attached to the missile so as to radiate linearly polarized signal(s). The direction of the principal lobe of the aforementioned antenna array is controlled by an electronic phase switch portion of the transmitter device. The principal lobe is switched back and forth in an identifiable, asymmetrical sequence. A ground receiver device portion of the missile orientation monitor via a receiver antenna unit portion and a receiver unit portion receives the linearly polarized signal(s) in two cross-polarized directions and determines the magnitudes of the ratio thereof so as to identify the plane of the missile in respect to the position of the linearly polarized antenna array on its body frame. The attendant 180° ambiguity is resolved by observing the temporal modulation of the signal to determine which lobe position is being received.

BRIEF DESCRIPTION OF THE DRAWINGS

The previously stated objects, other objects, features and advantages of the present invention will be apparent from the following more particular description of a preferred embodiment as illustrated in the accompanying drawings, in which.

DESCRIPTION OF THE PREFERRED EMBODIMENT

The following is a description and some operational aspects of a missile orientation monitor employing the present invention in conjunction with a missile of the rolling type. A more detailed discussion of the operation of the present invention is provided hereinafter in the section entitled, "STATEMENT OF THE OPERATION".

Figure 1:
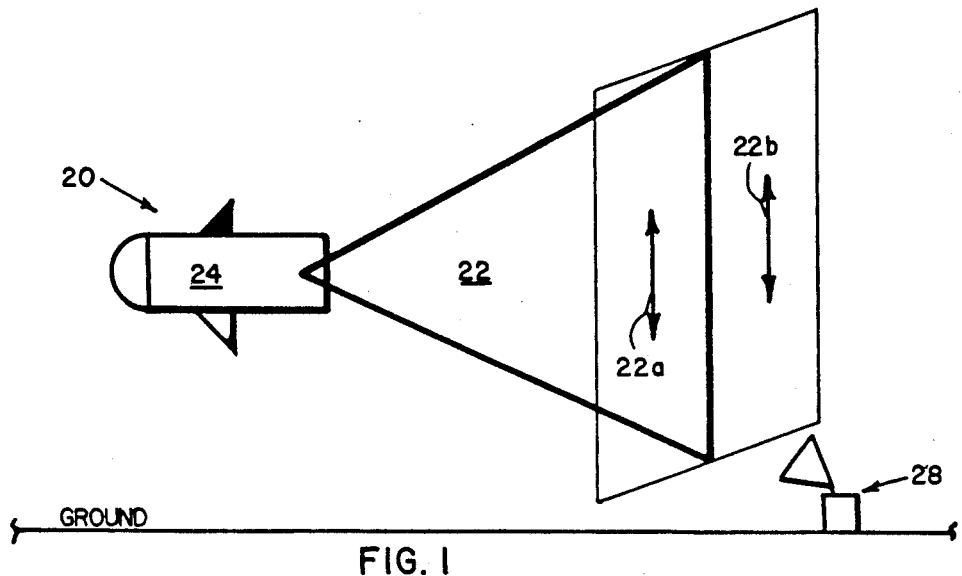
FIG. 1 depicts the polarized plane identification technique employed in the present invention.
Figure 2:
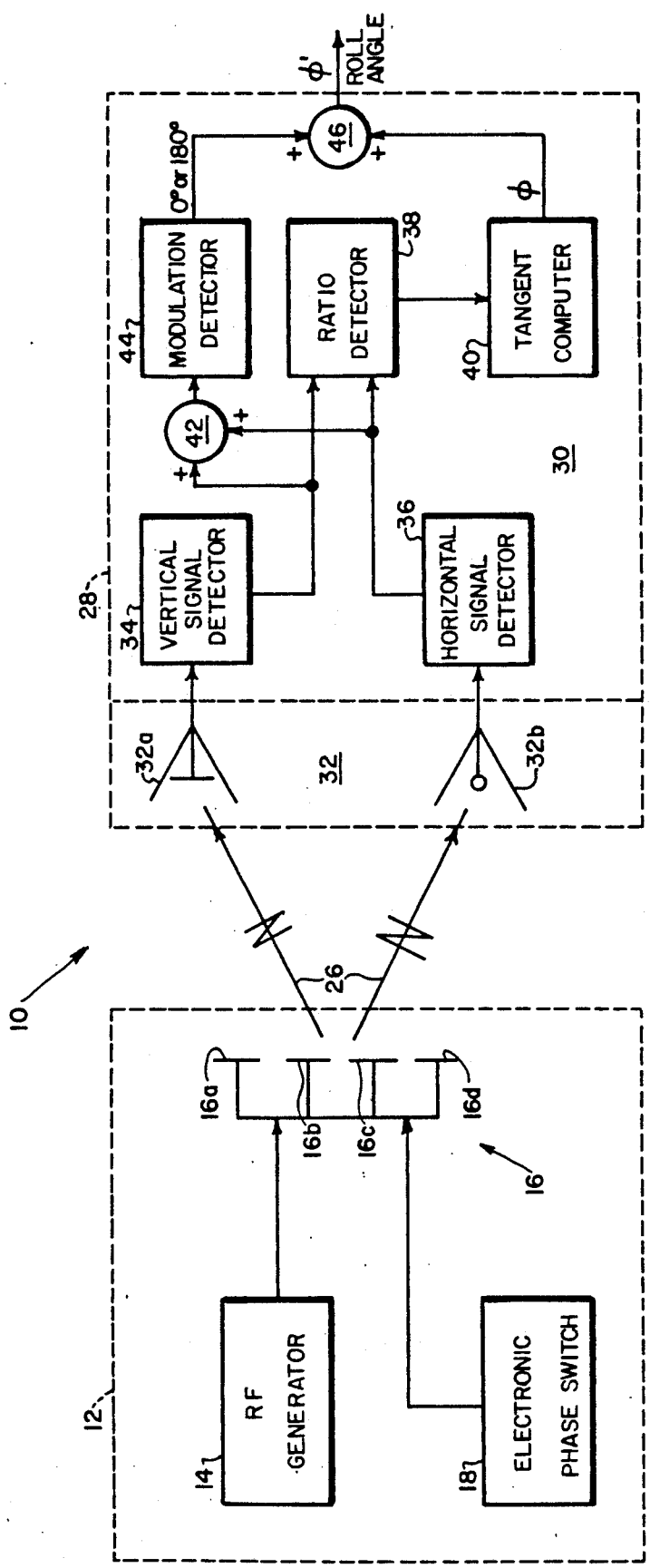
FIG. 2 is a schematic and block diagram representation of a missile orientation monitor in which the present invention is employed.

Referring then to FIGS. 1 and 2 concurrently, a missile orientation monitor 10 comprises an air transmitter device 12 which includes a RF generator 14, a transmitter antenna array 16, and an electronic phase switch 18. The air transmitter device 12 portion of missile orientation monitor 10 is placed on board a missile 20 and transmitter antenna array 16 is disposed thereon such that missile 20 identifies a given plane of polarization 22 with respect to its body frame 24. Electronic phase switch 18, being operatively connected to transmitter antenna array 16 which is linearly polarized, sequentially changes the phase between elements 16a, 16b, 16c and 16d thereof to produce a linearly polarized signal(s) having a vertically polarized equal power lobe component 26(I) and a vertically polarized equal power lobe component 26(II).

Still referring to FIGS. 1 and 2 as viewed concurrently, missile orientation monitor 10 further comprises a ground receiver device 28 which includes a receiver unit 30 and an antenna unit 32. Vertically polarized antenna 32a and horizontally polarized antenna 32b of antenna unit 32 receive the vertically and horizontally polarized components, respectively, of linearly polarized signal(s) 26 from air transmitter device 12. Receiver unit 30 includes a vertical signal detector 34, a horizontal signal detector 36, a ratio detector 38, a tangent computer 40, a summer 42, a modulation detector 44, and another summer 46.

Continuing, the amplitudes of the vertically and/or horizontally polarized received signals, aforementioned, are obtained in detectors 34 and 36, respectively, and the ratio of these amplitudes is obtained in ratio detector 38. This ratio is the arc tangent of the roll angle $\phi$ of missile 20 with respect to the horizontal as represented by the ground level as shown. The roll angle $\phi$ is obtained from the foregoing signal in tangent computer 40. The outputs of detectors 34 and 36 are also summed in summer 42 which feeds modulation detector 44. Modulation detector 44 derives signals of different magnitudes corresponding to 0° or 180° depending on whether lobe component 26(I) or lobe component 26(II), respectively, is present. This signal is added to the roll angle $\phi$ in summer 46 to provide a roll angle $\phi'$ without ambiguity.

STATEMENT OF THE OPERATION

Details of the operation, according to the present invention, are explained in conjunction with FIGS. 1, 2, 3, 4, 5a and 5b, and 6.

Figure 3:
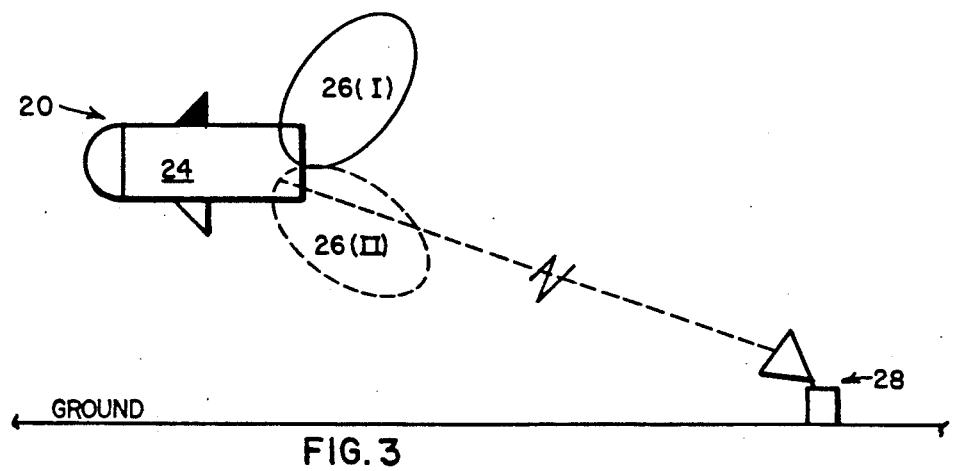
FIG. 3 illustrates, inter alia, the transmitter lobe structure created by the air transmitter device portion of the missile orientation monitor of FIG. 2.

Referring then to FIGS. 1, 2 and 3, as viewed concurrently, by transmitting from air transmitter device 12 back to ground receiver device 28 a linearly polarized signal(s) 26, missile 20 identifies a given plane of polarization 22 with respect to its body frame 24. The plane of polarization 22, and accordingly, the plane of missile 20 with respect to its body frame 24, is identified at ground receiver device 28 by comparing the ratio of linearly polarized signal(s) 26 in any two cross-polarized directions thereof in ratio detector 38. However, as illustrated in FIG. 1, with the normal transmission of linearly polarized signal(s) 26 there is an attendant 180° ambiguity because of symmetry of the 0-180° directions thereof as depicted by polarization directional arrows 22a and 22b.

Still referring to FIGS. 1, 2 and 3, as viewed concurrently, the attendant 180° ambiguity is resolved by transmitter antenna array 16, comprising elements 16a, 16b, 16c and 16d, being switched back and forth by electronic phase switch 18 between equal power lobes 26(I) and 26(II) of linearly polarized signal(s) 26, aforementioned. The switching times are unequal, i.e., the "on" and "off" times of the signals corresponding to equal power lobes 26(I) and 26(II).

Figure 4:
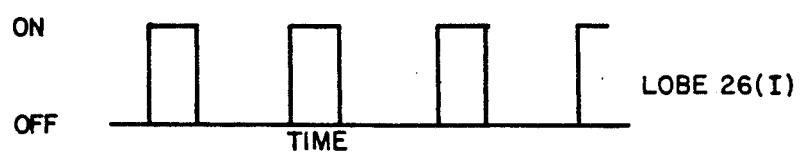
FIG. 4 shows, in waveforms, the transmitter lobe switching sequence employed in the present invention.
Figure 4:
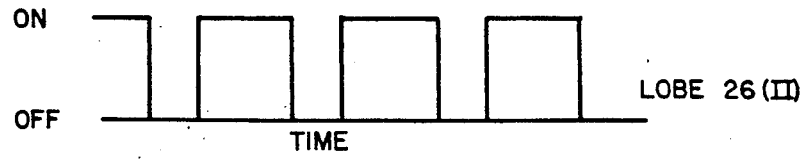
Figure 5A:
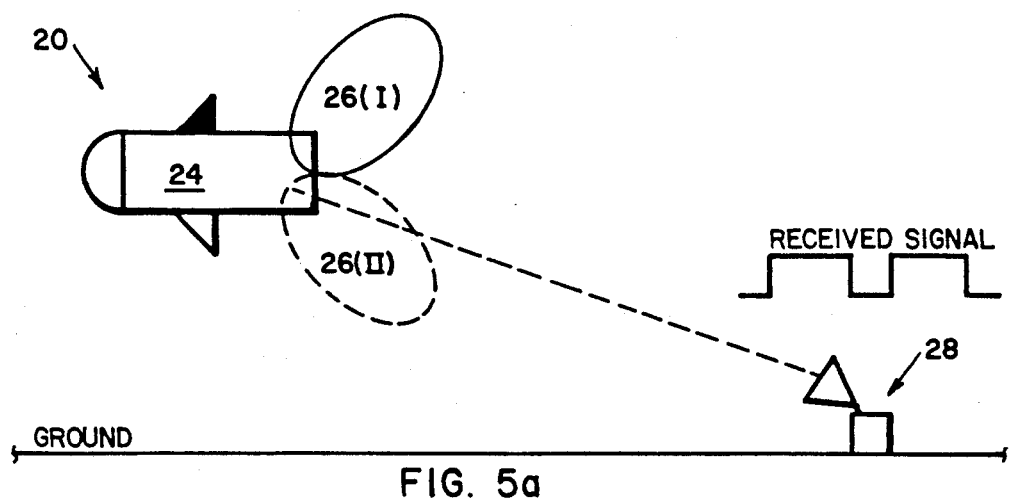
FIGS. 5a and 5b show two relative transmitter lobe positions, respectively, and the waveforms according to the switching sequence of FIG. 4 related thereto.
Figure 5B:
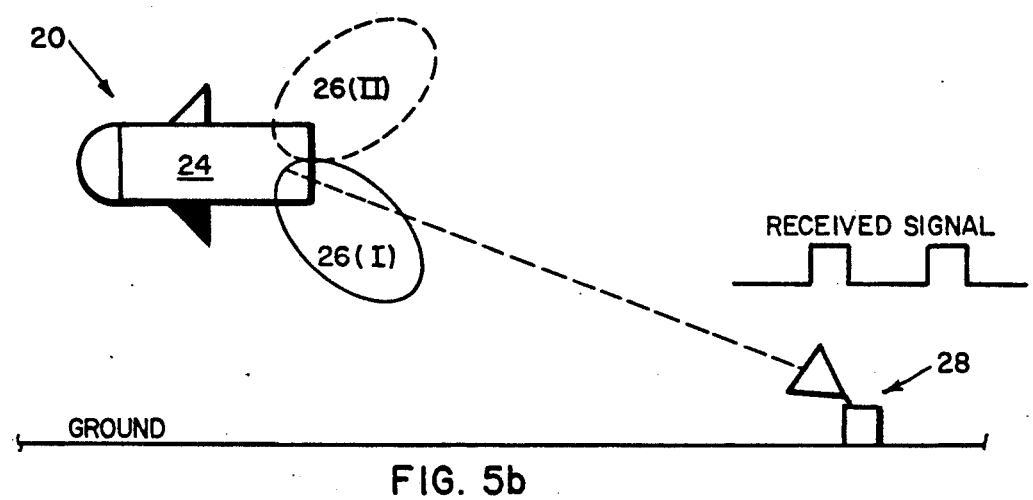

A simple mode of operation for the switching sequence is illustrated in FIG. 4, in which equal power lobe 26(I) is switched "on" for a short period and equal power lobe 26(II) is switched "on", sequentially, for a longer period of time. Thus, as illustrated in FIGS. 5a and 5b, the character of the received signal(s) corresponding to equal power lobes 26(I) and 26(II), respectively, now by their magnitudes indicated their relative positions with respect to receiver antenna unit 32. It should be mentioned that the switching rate of electronic phase switch 18 (see FIG. 1) is fast as compared to the expected roll rates of missile 20. For purposes of the present invention, the switching rate is 1,000 Hz, and the transmission signal frequency is in the range of 0.5 to 10 GHz.

Figure 6:
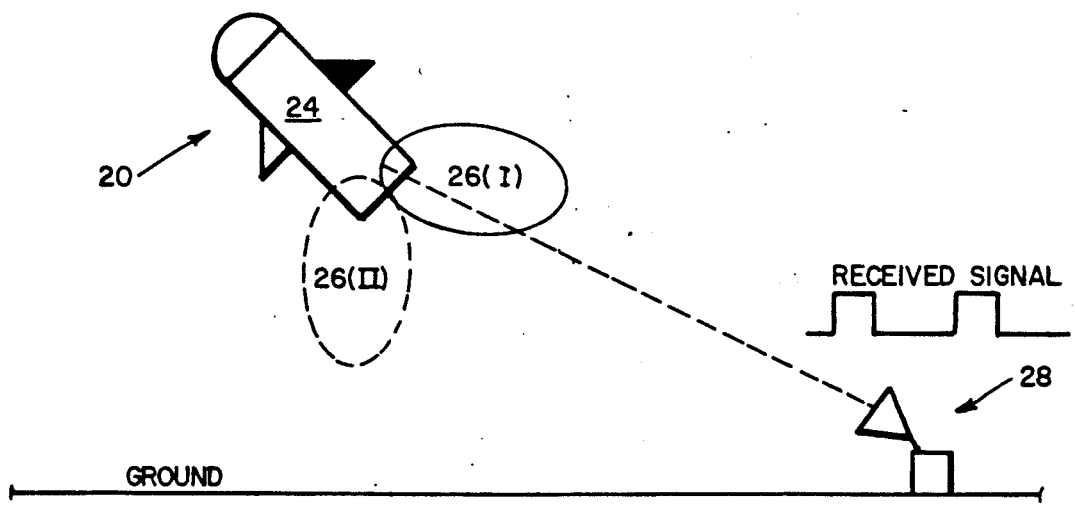
FIG. 6 shows the relative transmitter lobe position of FIG. 5a and the resulting lobe geometry during a climb maneuver and the waveform related thereto, according to the present invention.

As shown in FIG. 6, a pitching maneuver of the assumption of a large angle-of-attack by missile 20 will switch the positions of equal power lobes 26(I) and 26(II). This condition occurs with a change in polarization, as shown, and accordingly can be discriminated by the present invention as disclosed. Also, a simultaneous roll and pitch maneuver will appear as a rotation of polarization without a switching back and forth of equal power lobes 26(I) and 26(II). This condition can nevertheless be determined from the character of the received signal(s) corresponding to the aforementioned equal power lobes 26(I) and 26(II).

To those skilled in the art many modifications and variations of the present invention are possible in light of the above teachings. It is therefore to be understood that the present invention can be practiced otherwise than as specifically described herein and still be within the spirit and scope of the appended claims.

What is claimed is:

1. A missile orientation monitor for determining the orientation (roll angle), from the ground, of a missile relative to a target such that an explosive charge therein can be exploded at the optimum location from the target, said missile orientation monitor comprising:
   a transmitter device disposed on the missile and configured so as to transmit therefrom, a linearly polarized signal(s) having two cross-polarized components as a function of the relative position of the missile with respect to the ground, such that the missile identifies a given plane of polarization with respect to its body frame; and a receiver device for receiving the linearly polarized signal(s) in two predetermined cross-polarized directions and being configured to compute the ratio of the magnitudes thereof and to detect the modulation thereof so as to produce a signal tantamount to the roll angle of the missile without ambiguity.

2. The missile orientation monitor of claim 1 wherein said transmitter device further comprises:

a linearly polarized antenna array attached to the missile so as to radiate the linearly polarized signal(s);

an RF generator operatively connected to said linearly polarized antenna array for generating a transmission signal of a predetermined frequency; and an electronic phase switch operatively connected to said linearly polarized antenna array for switching the elements thereof back and forth between two equal power lobes of the linearly polarized signal(s).

3. The missile orientation monitor of claim 2 wherein said receiver device further comprises:

a receiver antenna unit for receiving the linearly polarized signal(s) in the two predetermined cross-polarized directions; and a receiver unit operatively connected to said receiver antenna unit for determining the magnitudes of the ratio of the linearly polarized signal(s) in the two predetermined crossedpolarized directions so as to identify the plane of the missile in respect to the position of said linearly polarized antenna array on its body frame, the attendant 180° ambiguity being resolved by detecting the temporal modulation of the linearly polarized signal(s) to determine which of the two equal power lobe signals thereof is being received.

4. The missile orientation monitor of claim 3 wherein said receiver antenna unit further comprises:

a vertically polarized antenna for receiving the vertical component of the linearly polarized signal(s); and a horizontally polarized antenna for receiving the horizontal component of the linearly polarized signal(s).

5. The missile orientation monitor of claim 4 wherein said receiver unit further comprises:

a vertical signal detector operatively connected to said vertically polarized antenna for detecting the amplitude of the signal thereat;

a horizontal signal detector operatively connected to said horizontally polarized antenna for detecting the amplitude of the signal thereat;

a ratio detector operatively connected to said vertical signal detector and said horizontal signal detector for detecting the ratio of the amplitudes of the signals at its input, the ratio corresponding to the arc tangent of the roll angle of the missile with respect to the horizontal;

a tangent computer operatively connected to said ratio detector for computing the tangent of the roll angle;

a first summer operatively connected to said vertical signal detector and said horizontal signal detector for summing the outputs thereof;

a modulation detector operatively connected to said first summer for deriving signals of different magnitudes corresponding to 0° or 180° depending on which of the two equal power lobe signals is present; and a second summer operatively connected to said tangent computer and said modulation detector for summing the signal corresponding to the tangent of the roll angle and the signal corresponding to the equal power lobe signal being received so as to derive a signal corresponding to the roll angle without ambiguity.

* * * * *